(12) United States Patent
Jarzyna

(10) Patent No.: US 6,374,700 B1
(45) Date of Patent: Apr. 23, 2002

(54) TRANSMISSION/TRANSFER CASE EXTENSIONLESS OUTPUT ARRANGEMENT

(75) Inventor: Peter Jarzyna, Livonia, MI (US)

(73) Assignee: Chrysler Corporation, Auburn Hills, MI (US)

( * ) Notice: Subject to any disclaimer, the term of this patent is extended or adjusted under 35 U.S.C. 154(b) by 691 days.

(21) Appl. No.: 08/806,503

(22) Filed: Feb. 24, 1997

Related U.S. Application Data

(63) Continuation of application No. 08/502,979, filed on Jul. 17, 1995, now abandoned, which is a continuation of application No. 08/161,045, filed on Dec. 3, 1993, now abandoned.

(51) Int. Cl.[7] ............................................. F16H 57/02
(52) U.S. Cl. ................................................... 74/606 R
(58) Field of Search ............................ 74/606 R, 607, 74/608

(56) References Cited

U.S. PATENT DOCUMENTS

| | | | |
|---|---|---|---|
| 1,085,501 A | 1/1914 | Smith | 74/607 |
| 1,169,058 A | 1/1916 | Ward et al. | 74/607 |
| 1,614,992 A | 1/1927 | Roberts | 74/607 |
| 1,736,836 A | 11/1929 | Rayburn | 74/607 |
| 2,226,388 A | 12/1940 | Richter | 74/607 |
| 2,402,637 A | 6/1946 | Keese | 74/326 |
| 2,547,268 A | 4/1951 | Jacobi | 180/75 |
| 2,918,825 A | 12/1959 | Bade | 74/606 |
| 3,636,909 A | 1/1972 | Benson | 115/34 R |
| 4,298,085 A | 11/1981 | Moroto et al. | 180/247 |
| 4,807,492 A | 2/1989 | Moroto et al. | 74/606 R |
| 4,942,780 A | 7/1990 | Fujisaki et al. | 74/607 |
| 5,011,465 A * | 4/1991 | Jeffries et al. | 475/279 |
| 5,076,057 A * | 12/1991 | Maruno | 475/279 |
| 5,142,940 A | 9/1992 | Hasegawa | 74/606 R |
| 5,203,747 A * | 4/1993 | Warren | 475/279 |
| 5,339,707 A * | 8/1994 | Arbus | 74/606 R |
| 6,029,532 A * | 2/2000 | Phillips | 74/606 R |

* cited by examiner

Primary Examiner—David Fenstermacher
(74) Attorney, Agent, or Firm—Mark P. Calcaterra

(57) ABSTRACT

A vehicle transmission housing or four-wheel drive transfer case housing which is shorter than previous arrangements, with the output shaft extending beyond the end thereof. As such, the drive shaft slip yoke or the output fixed yoke is mounted on the extended end of the shaft exterior of the seal at the exit end of the housing or transfer case, rather than extending through the seal into the housing or transfer case. The advantages include generally weight, part and machining reduction; reduced seal wear and performance requirements and, hence, minimized oil leakage; elimination of the usual grinding/polishing operations on the yoke; and consequent cost reduction.

15 Claims, 4 Drawing Sheets

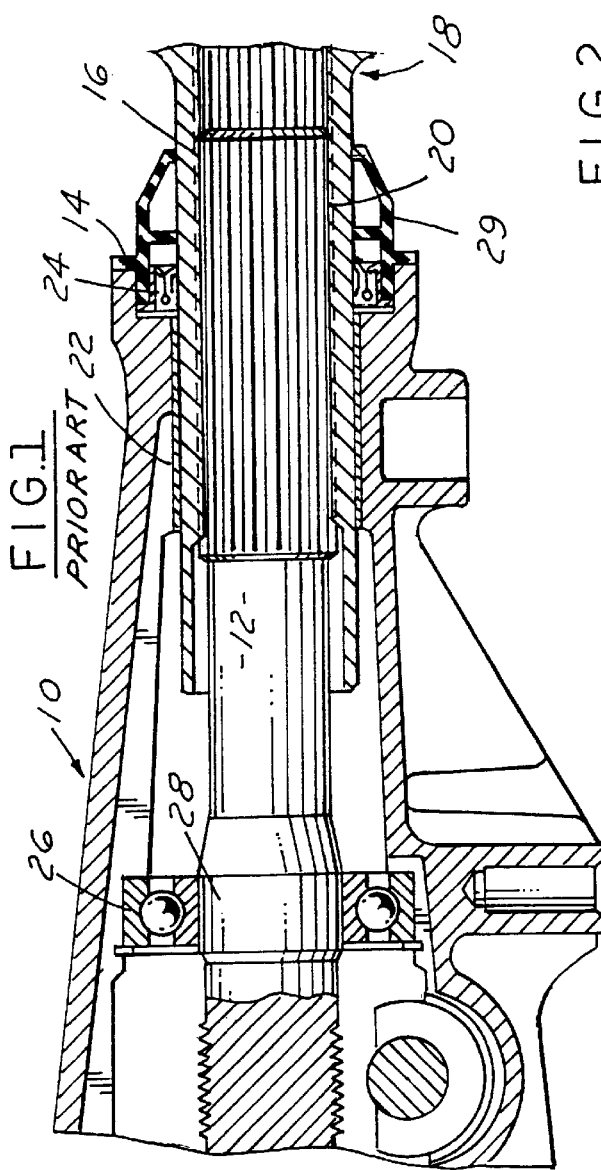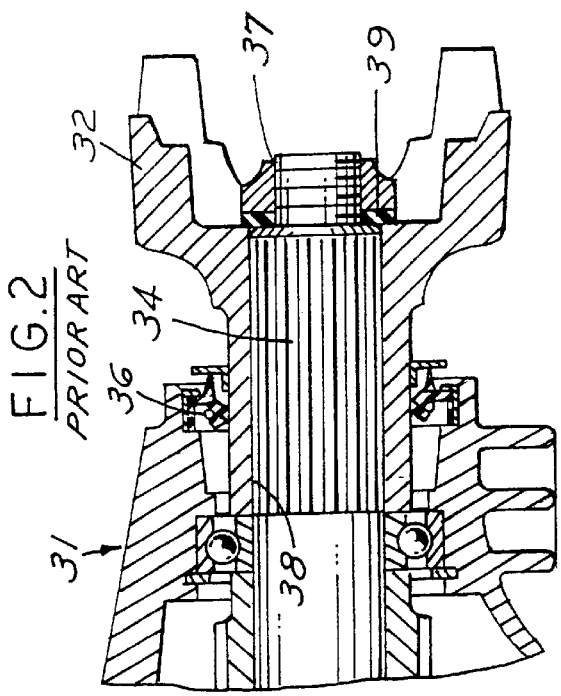

FIG.1A
*PRIOR ART*
FIG.1B
*PRIOR ART*
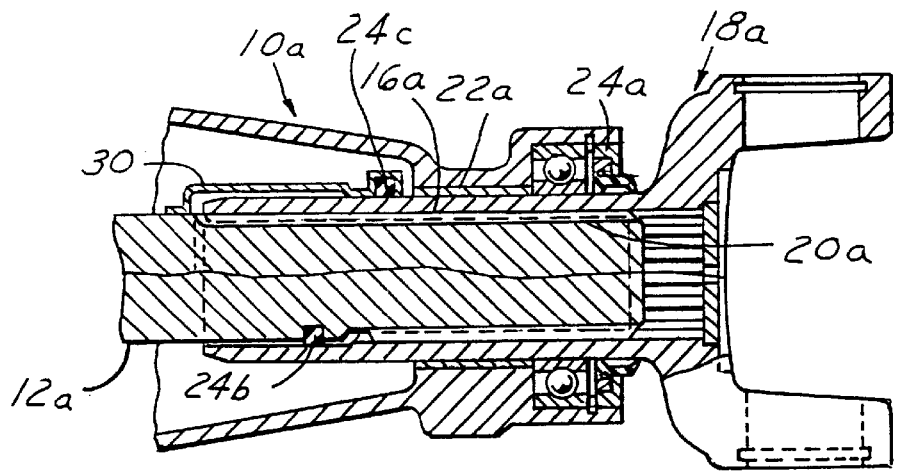
FIG.4B
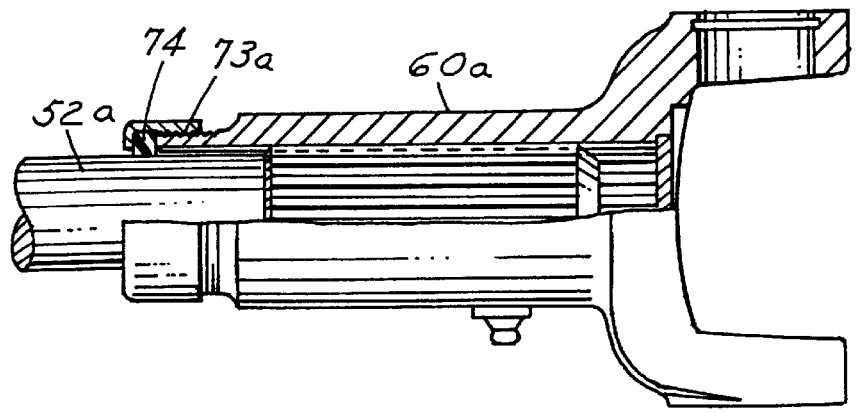
FIG.6
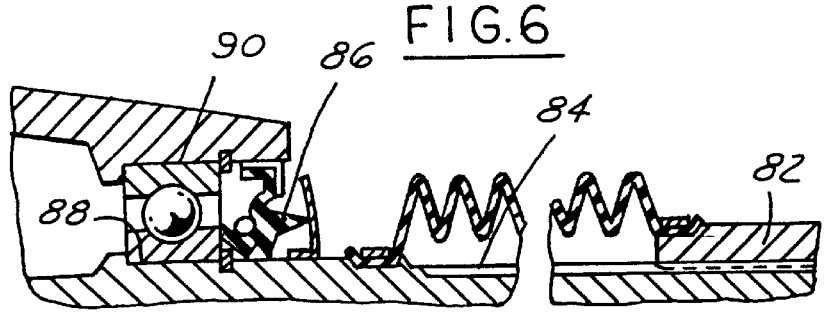

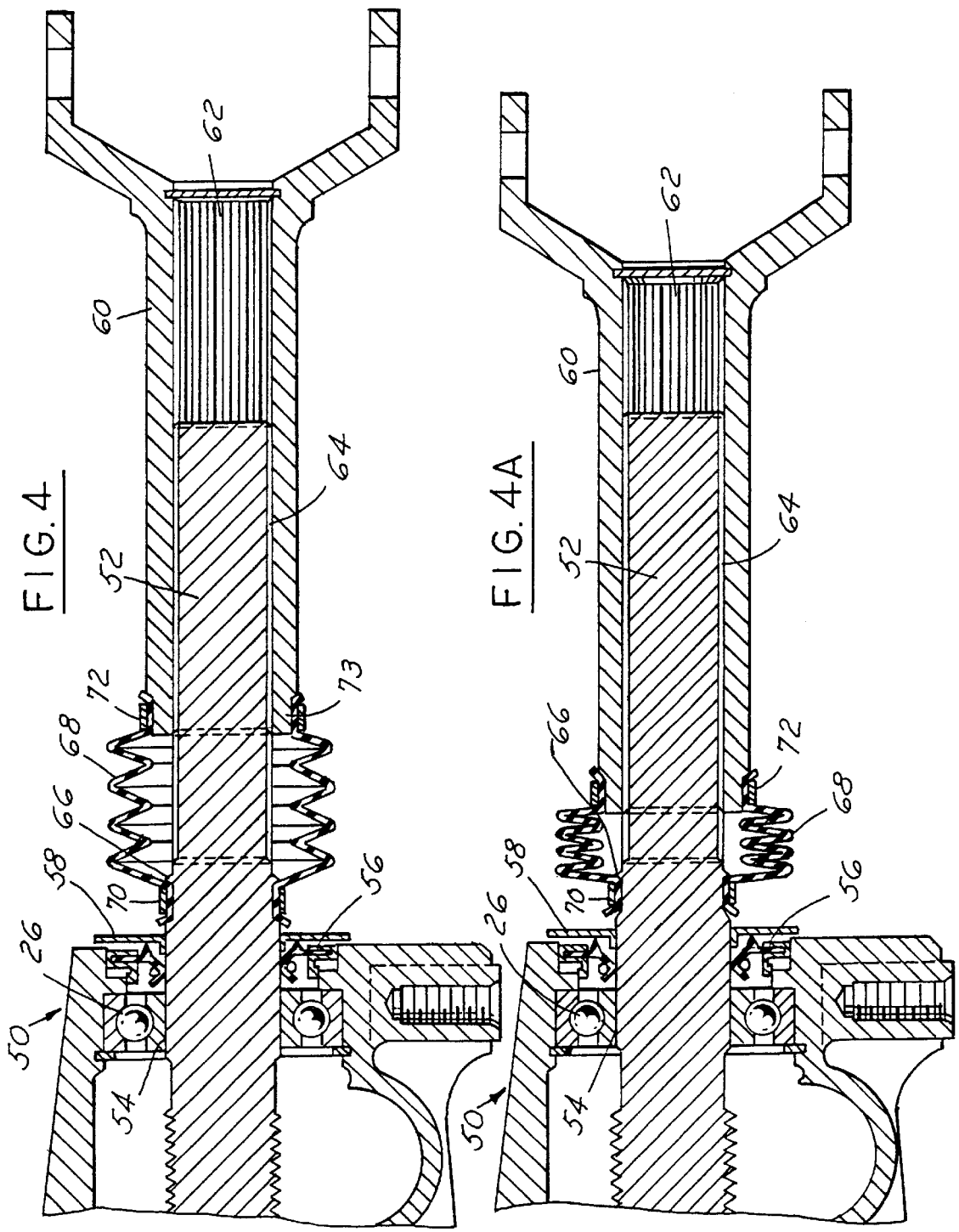

TRANSMISSION/TRANSFER CASE EXTENSIONLESS OUTPUT ARRANGEMENT

This application is a continuation of application Ser. No. 08/502,979, filed Jul. 17, 1995, now abandoned; which is a continuation of application Ser. No. 08/161,045, filed Dec. 3, 1993, now abandoned.

TECHNICAL FIELD

This invention relates generally to output arrangements from automatic and manual transmission housings and four-wheel drive transfer cases, and, more particularly, to such arrangements which are extensionless such that slip yokes or fixed yokes are retained external of the housing or transfer case.

BACKGROUND ART

Heretofor, transmissions and transfer cases have included either long integral or bolted-on output extensions, wherein either fixed or slip yokes entered the extension housing, such as shown in Moroto et al U.S. Pat. Nos. 4,298,085 and 4,807,492. These arrangements are in addition to downstream multi piece drive shafts and inboard slip type drive shafts.

DISCLOSURE OF THE INVENTION

A general object of the invention is to provide an improved transmission housing and transfer case output arrangement, resulting in weight reduction, part reduction, machining reduction, leakage reduction, improved shipping and installation, driveline noise reduction by the use of grease, and consequent cost and problem reduction.

Another object of the invention is to provide an output arrangement for automatic and manual transmission housings and for four-wheel drive transfer cases, wherein the usual slip yoke or fixed yoke is independent of the housing and transfer case.

A further object of the invention is to provide an extensionless output arrangement due to a shorter than previous automatic and manual transmission housing and a four-wheel drive transfer case without a bolted-on extension, such that the output shaft extends beyond the end of the housing and transfer case, with the slip yoke or fixed yoke mounted on the extended end of the output shaft and a seal mounted around the shaft immediately inside the exit end of the housing and transfer case.

These and other objects and advantages will become more apparent when reference is made to the following drawings and accompanying description.

BRIEF DESCRIPTION OF THE DRAWINGS

FIGS. 1, 1A, 1B, 2 and 3 are fragmentary cross-sectional views of prior art transmission housings (FIGS. 1, 1A 1B and 2) and four-wheel drive transfer case (FIG. 3) exit end portions;

FIGS. 4, 4B and 5 are fragmentary cross-sectional views of transmission housings (FIGS. 4 and 4B) and four-wheel drive transfer case (FIG. 5) exit end portions embodying the invention;

FIG. 4A is a fragmentary cross-sectional view of the FIG. 4 structure showing a different operational position thereof; and FIG. 6 is a fragmentary cross-sectional view of a four-wheel drive transfer case modified to incorporate the invention.

BEST MODE OF CARRYING OUT THE INVENTION

Figure 3:
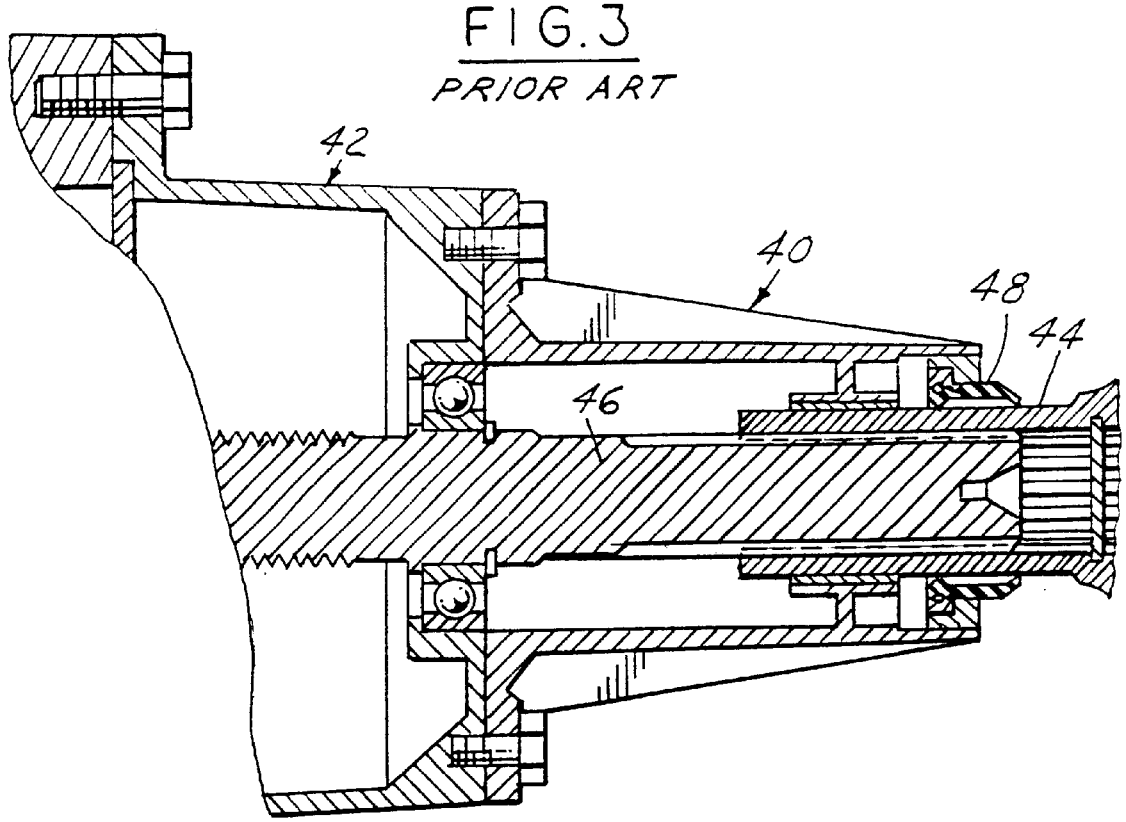

Referring now to the drawings in greater detail, FIG. 1 illustrates a prior art transmission housing 10 including an output shaft 12 extending from the output end 14 thereof. A set of splines 16 are formed on the end portion of the output shaft.

A slip yoke 18 having plated splines 20 formed on the inner surface thereof is slidably mounted on the splines 16 of the output shaft 12. A bushing or plain bearing 22 and seal 24 are mounted in the output end 14 around the ground and polished slip yoke 18. Further inward, it is noted that a rear output shaft bearing 26 is mounted around a bearing journal 28 formed on the shaft 12. A protective boot type cover 29 may be formed as part of the seal 24 on the output end 14.

FIG. 1A illustrates a prior art modification of the FIG. 1 structure, wherein, in lieu of the plated splines 20 of FIG. 1, unplated splines 20a on the slip yoke 18a mesh with splines 16a on the output shaft 12a. A bushing 22a and double lip seal 24a are mounted between the yoke 18a and the housing 10a. Grease is applied between the splines 16a and 20a and retained from mixing with transmission fluid by either an O-ring seal 24b (FIG. 1B) at the end of the splines, or an O-ring seal 24c and a retainer sleeve 30 (FIG. 1C).

FIG. 2 illustrates a prior art transmission housing 31, wherein a fixed yoke 32, is mounted around the end of the usual output shaft 34, and surrounded by a seal 36 within the end of the housing 31. The yoke 32 is secured to the shaft 34 by a nut 37 threadedly mounted on the end of splines 38 of the shaft 34, adjacent a seal 39.

By virtue of the routine jounce and rebound to which a vehicle is subjected, the slip yoke 18 is caused to repeatedly move in and out relative to the output shaft 12. This introduces grit and corroded surfaces into and against the surrounding seal 24, such that wear and, therefore, leakage therepast may eventually occur.

Additionally, the location of the seals 24 and 36, with respect to the rear bearings, such as bearing 26 of FIG. 1, is far enough removed, due to part tolerance stackup and axial distance, that it subjects the seals to increased eccentricity. The eccentricity at the seal-to-yoke interface increases the probability of leakage.

FIG. 3 illustrates still another prior art arrangement wherein a separate housing 40 is secured to a transfer case 42, in the case of four-wheel drive vehicles. Again, a slip yoke 44 is slidably mounted around the end of an output shaft 46, and is surrounded by a seal 48.

Referring now to FIG. 4, there is illustrated a shortened transmission housing 50 such that an output shaft 52 extends beyond the exit of the housing. As compared to the housing 10 of the FIG. 1 structure, the housing 50 ends just past a bearing journal 54 which is formed slightly longer than the bearing journal 28 in FIG. 1. The longer journal 54 surface serves to accommodate not only the usual rear output shaft bearing 26, but also a seal 56. The latter seal 56 is comparable in function to the seal 24 of FIG. 1, but is now smaller in diameter, and is no longer required to handle reciprocation.

As an optional item, particularly for off-the-road type vehicles, a metal dirt shield or, so-called, slinger 58 may also be mounted around the longer bearing journal 54 at the exit of the housing 50.

Beyond the journal 54, a slip yoke 60 having internal splines 62, is slidably mounted on mating splines 64 formed on the end portion of the output shaft 52. Inasmuch as the slip yoke 60 is no longer extended into the transmission housing 50, within a seal, as was the case for the slip yoke 18 in the transmission housing 10, the yoke 60 need not have a ground and polished outer surface or plated splines 62. Rather, the splines 62 and 64 need only be greased, since such grease will not become mixed with the transmission oil, as would have been the case for the FIGS. 1–3 structures. Furthermore, no special provisions are required to allow the use of grease as is the case for the FIG. 1A structure.

An annular flange or nub 66 is formed on the output shaft 52 a short distance from the journal 54 to accommodate the clamping of one end of a bellows 68 between the journal 54 and the nub 66 by a clamp 70. A second clamp 72 is mounted around the other end of the bellows 68 on a recessed end portion 73 of the slip yoke 60.

As shown in FIG. 4A, during the usual jounce and rebound characteristics of the vehicle, and the resultant sliding movement of the slip yoke 60 on the shaft 52, the bellows 68 intermittently collapses.

An alternative to the bellows 68, shown in FIG. 4B, is a sliding seal 74 retained around the shaft 52, adjacent the end of the yoke 60a, within a retainer 74a secured to the recessed end portion 73a of the yoke 60a.

Figure 5:
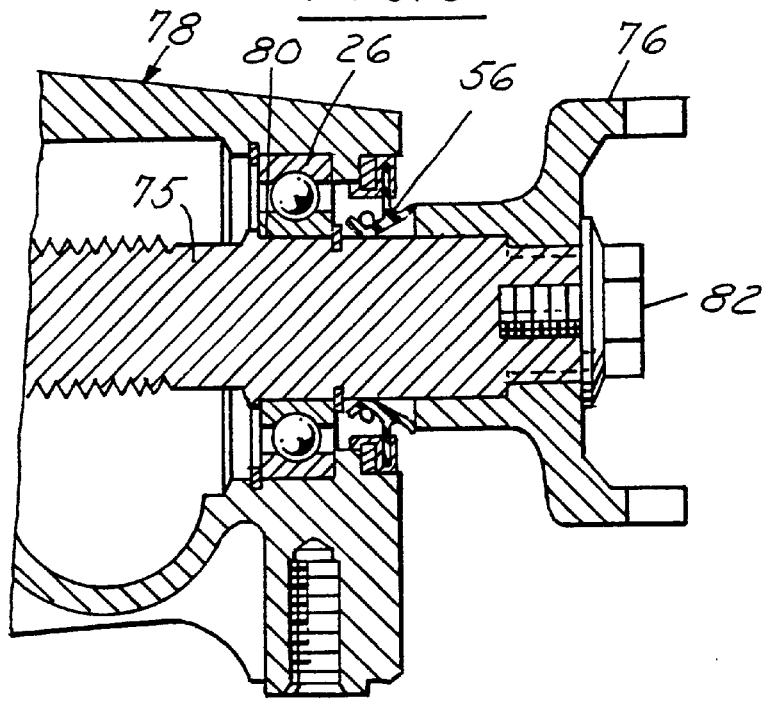

As illustrated in FIG. 5, an output shaft 75, which is adapted to accommodate a fixed yoke 76, receives the yoke 76 beyond the end of the transmission housing 78, wherein the bearing 26 and smaller diameter seal 56 are mounted around a bearing journal 80. As such, the fixed yoke 76 need not be extended into the housing 78, as was the case for the fixed yoke 32 of FIG. 2 within the transmission housing 30. In addition, it does not require a seal under a bolt head 82, such as required for the nut 37 of FIG. 2 to prevent fluid leakage through the splines 38.

For the prior art unit of FIG. 3, as shown in FIG. 6, the separate housing 40 is removed, and a slip yoke 82 is mounted on the output shaft 84 outside of the transfer case 42. A seal 86 is mounted around a longer journal 88 formed on the output shaft 84, along with the usual bearing 90.

INDUSTRIAL APPLICABILITY

It should be apparent that, since the invention provides a shortened transmission housing and a shortened transfer case, with a transmission output shaft extending therefrom, a seal mounted on the shaft just inside the exit end, and the yoke mounted exterior of the housing or transfer case, there results:

1. A savings of a mass of aluminum in the casting of the housing and transfer case;
2. The reduction of a tendency of a leak occurring at the exit end since the seal is not mounted on the reciprocating yoke during jounce and rebound of the vehicle;
3. The reduction of eccentricity at the seal journal since it seals against the same journal that is controlled by the shaft bearing, which reduces the propensity of seal leakage;
4. The elimination of a fluid leak path through the splines to the end of the yoke, and, in the case of the fixed yoke, the need for a spline seal;
5. Plating of the inside and grinding and polishing of the outside of the external yoke is no longer required;
6. A smaller diameter seal is required and less likely to wear when sealing against a bearing journal on the hardened steel shaft as compared to sealing against a cast iron yoke which may wear;
7. Driveline noise may be reduced due to the elimination of the plain bushing and the introduction of greased splines on the slip yoke application;
8. For slip yoke applications, the elimination of the cost of the plain bushing, its installation and finishing;
9. It is no longer necessary to put special shipping seals on the output so that fluid is not lost during shipping or installation;
10. The elimination of the possibility of special spline lubricants contaminating the transmission lubricant/fluid, as well as the need for additional devices to prevent contamination; and
11. For fixed and slip yoke applications, the use of the same case casting.

While but two general embodiments of the invention have been shown and described, other modifications thereof are possible within the scope of the following claims.

What is claimed is:

1. Any non-continuously variable, automotive transmission capable of only uni-directional power flow therethrough, and including one of an automatic transmission housing, a manual transmission housing, and a four-wheel drive transfer case, each including an output shaft having only one set of splines adapted to connect with a yoke and formed on the end thereof, and only one yoke with said only one yoke being mounted on the only one set of splines of the output shaft, wherein said housings or said transfer case is each formed to a length such that said output shaft extends outwardly therefrom with said only one set of splines completely external of said housings or transfer case, and said only one yoke is mounted on said external set of splines, and a seal is mounted to the transmission housings and transfer case and contacting said output shaft.

2. The transmission described in claim 1, wherein said yoke is one of a slip yoke or a fixed yoke.

3. The transmission described in claim 2, wherein mating splines are formed on said slip yoke and on said output shaft, and grease is inserted therebetween.

4. The transmission described in claim 2, and a fastener for securing said fixed yoke to said output shaft.

5. The transmission described in claim 1, and an O-ring seal mounted around the output shaft at the end of the yoke, and retained by an encompassing retainer secured to the end portion of the yoke.

6. The transmission described in claim 1, and a bellows clamped at one end thereof to said output shaft adjacent said housings, and clamped at the other end thereof to said yoke.

7. The transmission described in claim 1, and a journal surface formed on said output shaft just inside the exit end of said housings and said transfer case, and a seal mounted around said journal.

8. The transmission described in claim 7, and a bearing mounted around said journal interior of said seal.

9. Any non-continuously variable automotive transmission capable of only unidirectional power flow therethrough, and including a transmission housing having an open exit end, an output shaft having only one set of splines adapted to connect with a yoke and formed on an end thereof, said transmission housing being formed to a length such that said splines are positioned completely external of said exit end, a journal surface formed on said shaft immediately inside said exit end, a bearing and a seal mounted between said journal surface and said housing, and a yoke mounted on said splines.

10. The output shaft described in claim 9, wherein said yoke is a slip yoke slidably mounted on said output shaft.

11. The output shaft described in claim 10, and mating splines formed on each of said slip yoke and said output shaft, and grease included therebetween.

12. The output shaft described in claim 9, wherein said yoke is a fixed yoke secured to said output shaft.

13. The output shaft described in on claim 9, and a bellows secured between the yoke an d the output shaft adjacent said housing.

14. The output shaft described in claim 9, and a seal between the yoke and output shaft.

15. Any non-continuously variable automotive transmission capable of only uni-directional power flow therethrough, and including a transfer case having an open exit end, an output shaft having only one set of splines adapted to connect with a yoke and formed on an end thereof, said transfer case being formed to a length such that said splines are positioned completely external of said exit end, a journal surface formed on said shaft immediately inside said exit end, a bearing and a seal mounted between said journal surface and said transfer case, and a yoke mounted on said splines.

* * * * *